UNITED STATES PATENT OFFICE.

GEORGE KELLY, OF HINSDALE, ILLINOIS.

FIRE AND WATER PROOF COMPOSITION.

No. 882,890.         Specification of Letters Patent.       Patented March 24, 1908.

Application filed April 18, 1906. Serial No. 312,441.

*To all whom it may concern:*

Be it known that I, GEORGE KELLY, a citizen of the United States, residing at Hinsdale, in the county of Dupage and State of Illinois, have invented a new and useful Fire and Water Proof Composition, of which the following is a specification.

This invention relates to compositions that may be employed for a variety of purposes, such as insulation, binding material, and the like.

The principal object is to provide a simple, cheap, and effective composition that can be readily manufactured, and will withstand heat, fire and moisture.

The composition preferably comprises equal parts, by weight, of asphaltum and liquid glass, with which may be incorporated a fiber body, and the whole can be vulcanized.

In producing the composition, the asphaltum is reduced to or obtained in a liquid form, and the material commercially known as "gilsonite" has been found to be greatly superior to any other of the asphaltums, of which I am aware. This gilsonite is obtained from certain parts of Utah and the Indian Territory, and has peculiar characteristics that make it different from the ordinary grades of asphaltum, particularly on account of its superior insulating qualities, and because of its greater water-resisting properties. Gilsonite is completely soluble in the heavy distillate of Pennsylvania petroleum, in carbon disulfid and chloroform. Ninety-five per cent. is soluble in benzol, eighty-six per cent. is soluble in ethylic ether and ninety-five per cent. in absolute alcohol. Gilsonite may therefore be reduced to a liquid form by incorporation with any of the above well known substances. The liquid gilsonite is thoroughly mixed with the liquid glass, thereby producing a fluid composition that can be employed for a variety of purposes. Thus, it may be used in covering steam, hot water pipes, and the like. It may be employed as a binder for insulating purposes, and is not injured or damaged by heat or moisture. This is one of the decidedly advantageous features of the composition.

It is a well known fact that asphaltum and gilsonite are inflammable, and that liquid glass is affected by water, but the composition produced in the manner described, is not affected by either, the liquid glass apparently partaking of the water proof virtues of gilsonite, and the latter being made fire proof by the former. A further advantage in the composition is the high luster or polish obtained, giving a much more ornamental effect and finish to the body to which it is applied, than is ordinarily secured. The composition is peculiarly useful as a vulcanizable substance, and in order to give body to the same, as well as to form articles therefrom, fiber such as paper pulp, cotton or flax fiber may be added to the composition, and the whole then molded and vulcanized to produce such articles. In this connection, it may be stated that experience has demonstrated the above to be true, particularly for light vulcanizing purposes, though of course any well known vulcanizing material can be added if desired.

No claim is herein made to the vulcanized product nor to the employment of fiber, as these features are embodied in co-pending divisional applications, filed July 25, 1907, Serial Nos. 385,574, and 385,575.

Having thus fully described my invention, what I claim as new, and desire to secure by Letters Patent, is:—

1. A fire and water-proof composition, consisting of a mixture of asphaltum incorporated directly with liquid glass.

2. A fire and water-proof composition, consisting of a mixture of asphaltum reduced to liquid form and liquid glass.

3. A fire and water-proof composition, consisting of a mixture of gilsonite and liquid glass.

4. A fire and water-proof composition, consisting of a mixture of gilsonite reduced to liquid form and liquid glass.

5. A fire and water-proof composition, comprising a mixture of gilsonite and liquid glass in equal parts.

In testimony, that I claim the foregoing as my own, I have hereto affixed my signature in the presence of two witnesses.

GEORGE KELLY.

Witnesses:
     JOHN H. SIGGERS,
     E. G. SIGGERS.